United States Patent [19]

Sackmann et al.

[11] 4,113,506
[45] Sep. 12, 1978

[54] EMULSIONS OF RESINIC ACID ISOCYANATES AS SIZING AGENTS FOR PAPER

[75] Inventors: Günter Sackmann, Leverkusen; Udo-Winfried Hendricks, Odenthal-Voiswinkel; Hans-Ludwig Honig; Günter Kolb, both of Leverkusen; Friedhelm Müller, Odenthal, all of Fed. Rep. of Germany

[73] Assignee: Bayer Aktiengesellschaft, Fed. Rep. of Germany

[21] Appl. No.: 749,455

[22] Filed: Dec. 10, 1976

[30] Foreign Application Priority Data

Dec. 19, 1975 [DE] Fed. Rep. of Germany ....... 2557409

[51] Int. Cl.² ............................................... C08J 3/02
[52] U.S. Cl. .................................. 106/238; 106/239; 106/241; 106/285; 162/180

[58] Field of Search ............... 106/218, 238, 236, 239, 106/285, 287 R, 235, 277; 260/102, 97, 29.2 TN; 428/423, 496; 536/63; 162/180

[56] References Cited

U.S. PATENT DOCUMENTS 2,492,938  12/1949  Sackmann et al. .................. 260/102

FOREIGN PATENT DOCUMENTS 804,504  11/1958  United Kingdom.

Primary Examiner—Lorenzo B. Hayes
Assistant Examiner—W. Thompson
Attorney, Agent, or Firm—Connolly and Hutz

[57] ABSTRACT

Stable aqueous emulsions comprising a resinic acid isocyanate, a non-ionic and/or anionic emulsifier and an optionally chlorinated hydrocarbon are used as sizing agents for paper or paper-like materials.

3 Claims, No Drawings

EMULSIONS OF RESINIC ACID ISOCYANATES AS SIZING AGENTS FOR PAPER

This invention relates to aqueous emulsions of resinic acid isocyanates which are suitable for use as sizing agents for paper or paper-like materials.

The use of isocyanates in the manufacture of paper is known. For example, British Patent Specification No. 804,504 describes a process for the production of paper, in which a compound capable of reacting with the hydroxyl groups in the cellulose is added to the aqueous pulp of cellulose fibres before the dipping process. Among the compounds mentioned as being suitable for this purpose, in addition to the preferred ketenes, are anhydrides, azides and aliphatic isocyanates containing at least 8 carbon atoms, such as for example octadecyl isocyanate or cetyl isocyanate. However, it is essential in this known process simultaneously to add an activated clay, such as bentonite for example. U.S. Pat. No. 2,492,928 describes the reaction of isocyanates of "stabilised resinic acids" with the hydroxyl groups of cellulose-containing textile materials. In the context of this U.S. Patent Specification, "stabilised resinic acids" are understood to be resins of the type which contain the hydrocarbon nucleus of dehydroabietic acid, dihydroabietic acid, tetrahydroabietic acid, polyabietic acid or the corresponding pimaric acid derivatives.

It is known that these resinic acid isocyanates can be produced by phosgenating the corresponding amines.

However, the resinic acid isocyanates according to U.S. Pat. No. 2,492,928 and also other isocyanates such as, for example, stearyl isocyanate, isophorone diisocyanate, tolylene diisocyanate, hexamethylene diisocyanates etc., have not hitherto been suitable for sizing paper because they are readily hydrolysed on contact with water and are thus deprived of their sizing effect. In addition, secondary products are formed during the isocyanate hydrolysis reaction to the further detriment of the sizing effect.

An object of the present invention is to provide stable aqueous emulsions of resinic acid isocyanates which are suitable for sizing paper and paper-like materials.

According to the invention, this object is achieved by virtue of the fact that non-ionic and/or anionic emulsifiers which are soluble in organic water-immiscible solvents are used for the production of the emulsions. Suitable solvents for the emulsifiers and also for the resinic acid isocyanates are primarily aliphatic, cycloaliphatic or aromatic, optionally chlorinated hydrocarbon compounds, or mixtures thereof. Together with or dissolved in these solvents, the resinic acid isocyanates are emulsified in water by means of the above-mentioned emulsifiers.

It has surprisingly been found that these emulsions remain stable for prolonged periods, that the emulsified isocyanates undergo little or no hydrolysis and that the emulsions thus produced have an excellent sizing effect on a variety of different papers, even when used for the wet end in heavily diluted form. The stability of the emulsions against hydrolytic degradation is so high that they undergo little or no change even when heated with aqueous solutions of cellulose ethers containing amino groups (cationic starch).

The present invention relates to sizing agents for paper and paper-like materials comprising stable aqueous emulsions of resinic acid isocyanates, distinguished by the fact that solutions of resinic acid isocyanates are emulsified in water by means of non-ionic and/or anionic emulsifiers which are soluble in organic water-immiscible solvents, and by the fact that aliphatic, cycloaliphatic or aromatic, optionally chlorinated hydrocarbon compounds, or mixtures thereof, are used as solvents for the emulsifiers and the resinic acid isocyanates.

Resinic acid isocyanates of the type mentioned in U.S. Pat. No. 2,492,928 are preferably used for the production of the sizing agents according to the invention. Resinic acid isocyanates of this kind are, for example, dehydroabietyl isocyanate, dihydroabietyl isocyanate, tetrahydroabietyl isocyanate, polyabietyl isocyanate and the isocyanates of the corresponding pimaric acid derivatives. Dehydroabietyl isocyanate is preferably used. The isocyanates in question may be produced by the methods normally used for the production of isocyanates, for example by reacting the corresponding primary amines with phosgene.

Solvents suitable for dissolving the resinic acid isocyanates and the emulsifiers are, above all, branched or unbranched aliphatic, alicyclic, saturated, unsaturated or aromatic hydrocarbon compounds containing from 5 to 20 carbon atoms and their chlorination products and mixtures. These solvents generally have boiling points in the range of from 50° to 250° C and preferably in the range of from 100° to 160° C. The following are mentioned as examples of suitable solvents: technical and standard commercial-grade mixtures of hydrocarbon compounds, such as petroleum ether, ligroin and petroleum fractions, n- and iso-paraffins containing from 5 to 20 carbon atoms and mixtures thereof, diisobutylene, cyclohexane, tetralin, decalin, benzene, toluene, xylene, chlorobenzene, trichloroethylene and carbon tetrachloride.

In the context of the invention, non-ionic emulsifiers soluble in organic solvents are generally compounds containing hydroxyl groups or compounds of the kind in which the hydroxyl groups are etherified or esterified. Examples of compounds containing hydroxyl groups are the reaction products of ethylene oxide and propylene oxide or of mixtures of ethylene oxide and propylene oxide with fatty alcohols, fatty acids, alkyl phenols, aryl phenols and, in particular, with benzyl phenyl phenol or nonyl phenol. Suitable compounds in which the hydroxyl groups are etherified or esterified are the reaction products of the above-mentioned compounds containing hydroxyl groups with activated vinyl compounds such as, for example, acrylonitrile, acrylic acid esters, methacrylic acid esters and acrylamide, or with carboxylic acid derivatives such as, for example, carboxylic acid anhydrides or carboxylic acid anhydrides or carboxylic acid halides. Anionic emulsifiers soluble in organic solvents are, for example, sulphosuccinic acid derivatives such as, for example, sulphosuccinic acid esters, sulphosuccinic acid ester sulphonamides, alkylbenzene sulphonates, alkyl sulphonates, fatty alcohol sulphates and sulphated fatty alcohol ethoxylates. Of the above-mentioned non-ionic and anionic emulsifiers, it is particularly preferred to use those which do not contain any isocyanate-reactive groups such as, for example, addition products of ethylene oxide with nonyl phenol of which the terminal hydroxyl groups, by reaction with acrylonitrile, are blocked for a reaction with the resinic acid isocyanates. The quantity in which the emulsifiers are used generally amounts to between 0.5 and 20 % by weight and preferably to between 2 and 10 % by weight, based on the resinic acid isocyanate. The preparation of aqueous emulsions of the resinic acid isocyanates may be carried out in different ways:

(a) A mixture of resinic acid isocyanate, emulsifier and organic solvents is run into water with stirring at temperatures in the range of from 0° to 100° C and preferably at temperatures in the range of from 10° to 30° C.

(b) The components resinic acid isocyanate, emulsifier and solvents are successively stirred into water under the conditions defined hereinafter.

The order in which the components are added is not critical and may even be reversed. In every case, a stable finely divided emulsion is formed in which the ratio by weight of organic phase to aqueous phase generally amounts to between 10 : 1 and 1 : 100.

The isocyanate content of the emulsions may be varied within very wide limits. By adopting the method described above, it is possible, for example, to produce highly concentrated emulsions which contain up to 80 % by weight of the resinic acid isocyanate and which may readily be diluted with water before they are used. However, it is also possible directly to produce highly dilute emulsions of the type for sizing paper with a resinic acid isocyanate content of as low as 0.01% by weight.

The resinic acid isocyanates may readily be emulsified by straightforward stirring. Thus, production of the emulsion may be carried out just before it is used as a sizing agent in the papermaking machine, thereby saving transport capacity.

The sizing agents according to the invention have a wide scope of application for the sizing of paper. They may be used on unsized and conventionally presized paper and in combination with other sizing agents on the surface and, preferably for the wet end. Another advantage of the sizing agents according to the invention is that, in cases where they are used with papers containing polyvalent metal ions, for example aluminium ions, they show only limited sensitivity to these metal ions, and that they do not adversely affect the effectiveness of optical brightness. In addition, graduated sizing is possible with the sizing agents according to the invention, in contrast to other synthetic reactive sizing agents. Furthermore, the sizing agents according to the invention surprisingly develop their full sizing effect immediately after drying of the papers, whereas sizing agents based on ketene dimers only develop their full sizing effect after the papers have been stored for 1 to 2 days. The sizing agents may be used in conjunction with acid, neutral or even basic fillers, such as kaolin, china clay or, in particular, chalk and with additives such as carboxymethyl cellulose or, in particular, starch.

The effectiveness of the new sizing agents is not affected by fluctuations in the pH-range of the sizing bath. Thus, at pH-values in the range of from 4 to 11 and preferably in the range of from 5 to 10, the sizing effect of the new sizing agents is always equally good both where they are used in unsized paper and where they are used in conventionally presized paper. Another particular advantage of the emulsions according to the invention is that they have a good sizing effect even when used in very small quantities, based on the dry pulp.

The products may be applied by impregnating or spraying the paper or, preferably, by addition to and admixture with the pulp. The production of the new sizing agents and the way in which they work are described by way of example in the following. The percentage contents quoted are based on weight unless otherwise stated. The parts quoted are parts by weight.

EXAMPLE 1

In an Erlenmeyer flask, 60 parts of dehydroabietyl isocyanate are dissolved while stirring at room temperature in 20 parts of a relatively high boiling standard commercial-grade petroleum fraction with the boiling range 100° to 160° C (for example Isopar M, a product of Humble Oil and Refinery Company, or Solvesso 100, a product of the Esso company), followed by the addition of 6 parts of an emulsifier with the following constitution:

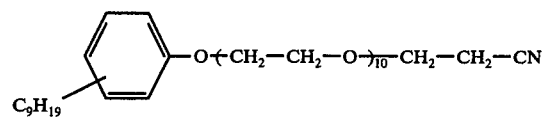

30 Parts of water are then added to this solution with constant stirring. A finely divided stable emulsion is formed. The NCO-content of the dehydroabietyl isocyanate can be determined by reacting the dehydroabietyl isocyanate in the emulsion with excess dibutylamine and titrating the unused dibutylamine with 1 N HCl. It was found that this NCO-content falls only very slightly from 13.2 % during production of the emulsion is 12.2 % after 3 days and to 10.8 % after 7 days.

EXAMPLE 2

6 Parts of alkyl sulphonamide-2-ethyl hexanol sulphosuccinic acid ester amide are added as emulsifier to a solution of 120 parts of dehydroabietyl isocyanate in 40 parts of tetralin. By stirring this solution into 60 parts of water, a stable finely divided emulsion is obtained with an NCO-content which falls over a period of 7 days from 13.2 % to 12.1 %, based on the dehydroabietyl isocyanate used.

EXAMPLE 3

In order to test the effectiveness of the sizing agent emulsions, 80 g/m² papers were produced in a test paper-making machine from 50 % of bleached pine sulphite pulp and 50 % of bleached beech sulphate pulp (degree of grinding 40° SR) in the presence of 30 % of chalk (based on the dry pulp). The sizing emulsion described in Example 1 and, for comparison, a standard commercial-grade synthetic sizing agent based on stearyl diketene were added to the pulp.

The sizing effect was determined on the bqsis of the Cobb value. The results are set out in the following Table:

| Sizing agent | Cobb value a) |
| --- | --- |
| None | 82 g/m² |
| 0.5 % of the emulsion of Example 1 | 42 g/m² |
| 0.7 % of the emulsion of Example 1 | 26 g/m² |
| 1.0 % of the emulsion of Example 1 | 20 g/m² |
| 1.2 % of ketene dimer (commercial product | 35.7 g/m² |
| 1.5 % of ketene dimer commercial product | 25 g/m² | a) measured in accordance with DIN 53 132

EXAMPLE 4

Papers were produced in the same way as described in Example 3, two different types of chalk being used as filler. The papers were again sized with the emulsion produced in accordance with Example 1 and, for comparison, with a ketene dimer. To improve fixing of the sizing agents, 0.2 % of a 20 % wet strengthener based on polyamide amine was added to the pulp in each case.

| | Cobb value for addition of | |
|---|---|---|
| Chalk added | 0.5 % of the emulsion of Example 1 | 2 % of ketene dimer |
| 2 % of chalk DX 1[b)] | 19.3 g/m$^2$ | 19.0 g/m$^2$ |
| 5 % of chalk DX 1 | 19.6 g/m$^2$ | 18.7 g/m$^2$ |
| 15 % of chalk DX 1 | 20.7 g/m$^2$ | 18.3 g/m$^2$ |
| 2 % of chalk Socal P2[c)] | 20.6 g/m$^2$ | 19.0 g/m$^2$ |
| 5 % of chalk Socal P2 | 20.7 g/m$^2$ | 19.2 g/m$^2$ |

[b)] standard commercial-grade chalk for the pulp
[c)] standard commercial-grade chalk for the surface coating of paper.

EXAMPLE 5

In order to demonstrate that it is also possible with the sizing agent emulsions to obtain effective graduation of sizing or only weak presizing, papers with an addition of 30 % of chalk were produced in the same way as in Example 3. In order to improve fixing of the sizing agent, 0.2 % of a 20 % wet strengthener based on polyamide amine, for example Nadavin LT ®, a product of Bayer AG, or Kymene 537 ®, a product of Hercules, was added in each case. Sizing was carried out with graduated quantities of the sizing agent emulsion obtained in accordance with Example 1. The sizing effect was determined on the basis of the wet absorption of a 5% starch solution in a laboratory-type sizing press. The percentages quoted in the following Table for the wet absorption are based on the weight of the dry paper.

| Addition of sizing emulsion from Example 1 | Wet absorption in the sizing press |
|---|---|
| None | 78 % |
| 0.074 % | 53 % |
| 0.11 % | 37 % |
| 0.15 % | 32 % |
| 0.22 % | 26 % |
| 0.375 % | 19 % |

We claim:

1. An aqueous emulsion suitable as a sizing agent for paper or paper-like materials, the organic phase of said emulsion containing (1) a resinic acid isocyanate selected from the group consisting of dehydroabietyl isocyanate, dihydroabietyl isocyanate, tetrahydroabietyl isocyanate, polyabietyl isocyanate, dehydropimaric isocyanate, dihydropimaric isocyanate, tetrahydropimaric isocyanate and polypimaric isocyanate, (2) at least one emulsifying agent for said resinic acid isocyanate selected from the group consisting of non-ionic emulsifiers and anionic emulsifiers and (3) a water-immiscible solvent for said resinic acid isocyanate and said emulsifying agent selected from the group consisting of aliphatic, alicyclic and aromatic hydrocarbons having from 5 to 20 carbon atoms, chlorinated aliphatic, alicyclic and aromatic hydrocarbons having from 5 to 20 carbon atoms and mixtures of said hydrocarbons, the ratio by weight of the organic phase to the aqueous phase being between 10:1 and 1:100, the resinic acid isocyanate content of said emulsion being from 0.01 to 80% by weight and the amount of emulsifier being between 0.5 and 20% by weight, based on the weight of said resinic acid isocyanate.

2. The aqueous emulsion of claim 1 wherein said at least one emulsifying agent is free of functional groups which react with the selected resinic acid isocyanate.

3. A paper or paper-like material which is sized with the aqueous emulsion of claim 1.

* * * * *